United States Patent
Erb et al.

[15] 3,655,312
[45] Apr. 11, 1972

[54] APPARATUS FOR MAKING EMBOSSED FOAMED SURFACE COVERING MATERIALS

[72] Inventors: Edward R. Erb, Geryville; Richard L. Maass, Salisbury Township, Lehigh County, both of Pa.

[73] Assignee: GAF Corporation, New York City, N.Y.

[22] Filed: May 2, 1969

[21] Appl. No.: 821,409

[52] U.S. Cl. ............................ 425/115, 101/23, 156/79, 156/209, 156/220, 425/4, 425/367, 425/385, 425/817, 425/372
[51] Int. Cl. ........................................................ B31f 1/00
[58] Field of Search ............... 156/77, 78, 87, 209, 220, 590; 117/15; 161/5; 101/248, 23

[56] References Cited

UNITED STATES PATENTS

| | | | |
|---|---|---|---|
| 1,649,812 | 11/1927 | Crompton | 101/248 |
| 1,910,894 | 5/1933 | George et al. | 101/248 |
| 2,268,477 | 12/1941 | Elmendorf | 156/87 |
| 2,752,279 | 6/1956 | Alderfer | 156/78 |
| 3,024,154 | 3/1962 | Singleton et al. | 156/209 |
| 3,399,101 | 8/1968 | Magid | 156/209 |
| 3,408,248 | 10/1968 | Maass | 161/5 |
| 2,639,660 | 5/1953 | Sunderhauf et al. | 101/23 |

Primary Examiner—Benjamin A. Borchelt
Assistant Examiner—G. E. Montone
Attorney—Walter C. Kehm, Samson B. Leavitt and Martin Smolowitz

[57] ABSTRACT

Surface covering materials such as foamed vinyl floor coverings are manufactured by applying a foamable resin layer to a base or substrate, printing a pattern on the foamable layer, applying a transparent wear layer over the printing, heating the product to develop the foam, and then passing the foamed product through an embossing nip formed between a backing roll and an embossing roll, the latter having lands and valleys conforming with the printed pattern. The product is pulled through the embossing nip by drive means located beyond the embossing and backing rolls, the product being retained in sufficient surface contact with the backing roll to effect rotation of the backing roll without slippage, and the embossing roll is driven from the backing roll through a transmission providing for variation in the peripheral surface speed of the embossing roll to maintain registration of the lands and valleys of the embossing roll with the printed pattern.

8 Claims, 8 Drawing Figures

EDWARD R ERB
RICHARD L. MAASS

APPARATUS FOR MAKING EMBOSSED FOAMED SURFACE COVERING MATERIALS

BACKGROUND OF THE INVENTION

This invention relates to the production of surface covering materials and is particularly concerned with the manufacture of surface covering materials, such as floor coverings, incorporating a foamed resin layer carrying a printed decoration and further having an embossed pattern effect in registration with the printed pattern. In a typical product of this general kind, the foamed layer is applied to a base or substrate, usually a felt base and in addition a transparent wear layer is applied at the top of the product.

Certain techniques are already known for producing a product of the general kind here described having printed and embossed patterns in registration with each other. According to one such prior operation (see for example Maass U.S. Pat. No. 3,408,248 issued Oct. 29, 1968 and assigned to the assignee of the present application) the foamable material is initially applied and gelled in areas of different thickness and printing is then applied in a manner providing pattern registration with the lands and valleys of the foamable layer. This product is ultimately heated to expand or develop the foam.

According to another such prior operation (see for example Rugg application Ser. No. 555,489 filed June 6, 1966 and assigned to the assignee of the present application) the foamable layer applied to the base is formulated to contain both a blowing agent and a catalyst for lowering the decomposition temperature of the blowing agent and in the color printing operation an agent is applied in selected pattern areas adapted to deactivate the catalyst. Upon subsequent heating to develop the foam, the foaming agent is selectively decomposed in areas conforming with the printed pattern, thereby producing a relief pattern effect in registration with the printed pattern.

Various mechanical embossing techniques are also known, but heretofore it has not been fully satisfactory or practical to produce a relief pattern effect in registration with a printed pattern on a foamed type of surface covering material by the use of embossing rolls. Because the foamed layer has some appreciable thickness and is also a yielding or compressible type of material, it has been very difficult to maintain accurate registration between the embossing roll and the printed pattern. In addition, because the embossment of a foamed layer results in collapse of the air or gas cells within the foam structure, difficulties have been encountered in embossing foamed material as a result of the forcible displacement of the gas from the foam cells, which has sometimes tended to create blisters within the product. This has been particularly troublesome where the product, as is customary, also has an impervious top wear layer applied over the print decorated foamed layer. In such cases the mechanical embossing has tended to develop blistered or wrinkled areas in the top wear layer as a result of the displacement of the gas from the collapsed cells in the areas compressed by the embossing.

STATEMENT OF OBJECTS

It is a major objective of the present invention to make practicable the embossing of foamed resin surface covering materials by means of embossing rolls, and in accomplishing this objective, the invention provides a novel form of equipment, including a unique embossing roll drive system whereby registration of the embossed pattern with a previously applied printed pattern may readily be maintained. Moreover, in accomplishing this major objective, the invention also provides equipment which is not subject to the problem of producing wrinkles or blisters in the product being made.

Still further the present invention is concerned with a technique which not only makes practical continuous roll type embossing in registration with a pattern printed on a foamed resin layer, but also makes possible the achievement of deeper embossing than that obtainable with any of the prior operations for producing a relief effect in registration with a printed pattern carried on a foamed layer.

BRIEF DESCRIPTION OF DRAWINGS

How the foregoing objects and advantages are attained will appear more fully from the following description referring to the accompanying drawings, in which.

DESCRIPTION OF INVENTION IN RELATION TO DRAWINGS

Figure 1:
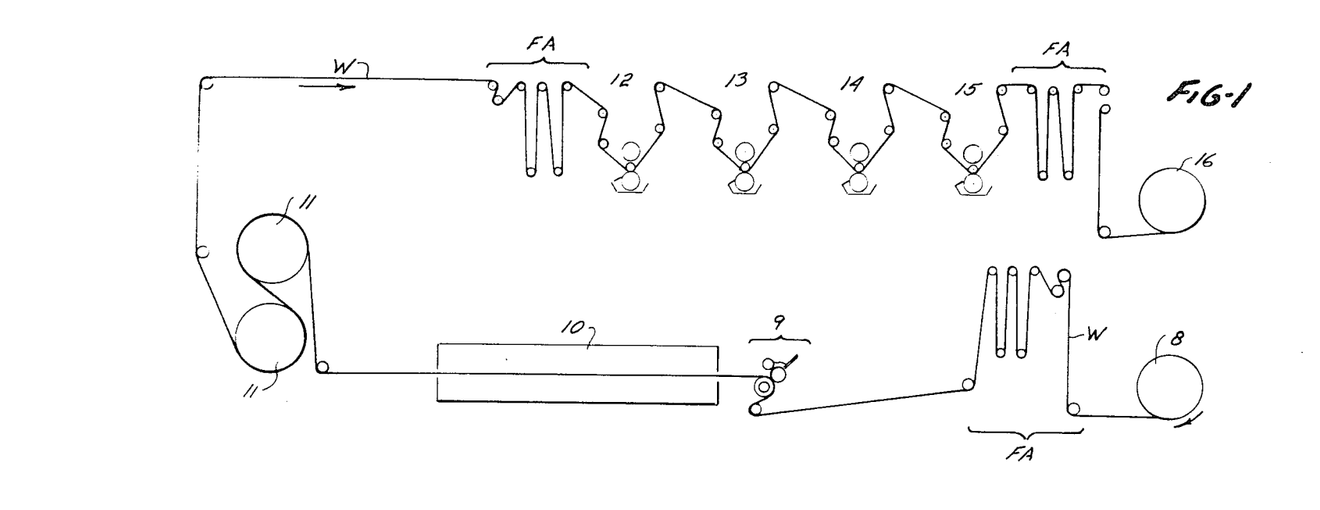
FIG. 1 is a diagrammatic illustration of an apparatus for continuously advancing a web of a base or substrate through a series of treatments including application of a foamable coat, gelling the foamable coat, and printing.
Figure 2:
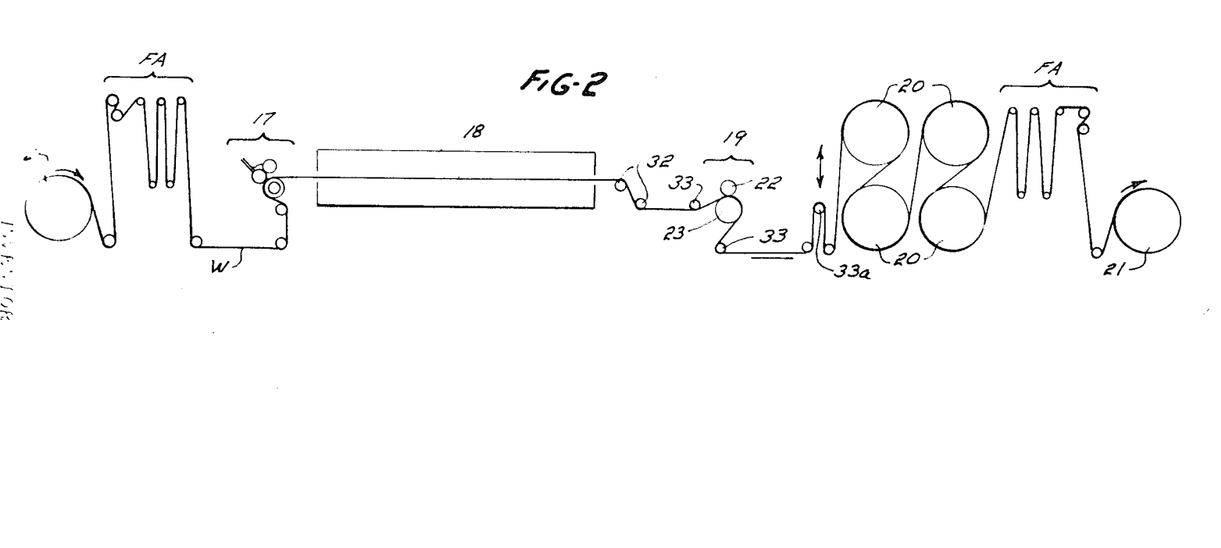
FIG. 2 is a diagrammatic illustration of an apparatus for continuously advancing a coated and printed web produced in accordance with FIG. 1 through additional treatment steps including application of a clear top coat, heating to develop the foam and fuse the resin materials, and emboss the foamed layer in registration with the printing.

In considering the drawings, reference is first made to the diagrammatic illustrations of FIGS. 1 and 2, and for purposes of the present description, it is assumed that the product being made is a floor covering comprising a base in the form of a felt, such as asbestos felt, and that the floor covering is made up by applying coatings to the felt, including a foamable polyvinyl chloride resin layer, a printed decoration, and a transparent top or wear layer, also comprising polyvinyl chloride resin material.

In FIG. 1 the felt base employed is supplied in the form of a web from a roll 8. The web, indicated in these diagrammatic figures by the letter W is fed through a festoon accumulator FA and then to a reverse roll coater 9 which serves to apply a foamable resin layer, preferably comprising polyvinyl chloride resin material incorporating a dispersed blowing agent. The web then passes through oven 10 serving to gell the coating applied at 9. From the oven the web passes over the cooling rolls 11 and then into another festoon accumulator in advance of delivery of the web to the printing equipment. Four stages of printing 12, 13, 14 and 15 are shown and it is here assumed that in each printing stage a rotogravure printing operation is performed, the four stages being provided for multicolored effects. After passing through another festoon accumulator the web may be wound up as indicated at 16.

This roll 16 of the web may then be placed in the supply position (toward the left) in FIG. 2 and the web is fed from the roll through a festoon accumulator and then to a reverse roll coater 17 employed to apply a clear polyvinyl chloride resin wear layer to the product over the printing. From the coater 17 the web passes through an oven 18 where it is heated sufficiently to decompose the blowing or foaming agent and thus develop the foam, and also fuse the resin materials. Upon leaving the oven the web passes through a roll embosser 19 which is arranged adjacent to the delivery end of the oven 18 sufficiently close to the discharge end of the oven so that the product is still in a relatively hot condition and may therefore more readily be subjected to the embossing action.

After delivery from the embosser the web passes over cooling cans or rolls indicated at 20 and, after passing through a festoon accumulator the finished product is rolled up as indicated at 21.

Although two separate runs are indicated in FIGS. 1 and 2, it should be understood that, if desired, all of the operations may be performed in a single pass of the web. Moreover, if desired, more than two passes may be utilized.

Before turning to the equipment illustrated in FIGS. 3 to 7 inclusive, it is mentioned that it is contemplated according to the present invention that the rolls of the roll embosser 19 are rotated under the influence of the web being drawn through the nip between the embosser rolls, rather than being driven from a separate source of power as in various prior art embossers. For this purpose the cooling rolls 20 are desirably driven, thereby serving to advance the web through the embossing nip.

With the foregoing in mind, attention is now directed to FIGS. 3 to 7 which illustrate in greater detail the roll embosser and appurtenant equipment. The roll embosser basically comprises two rolls, one of which, indicated at 22, is a roll provided with lands and valleys according to the embossed or relief pattern desired. The other roll, indicated at 23, is a backing roll, preferably a smooth surfaced roll. The embossing nip is provided between these two rolls, and the embossing roll 22 engages the top side of the product, (on which the foamed layer, pattern printing, and top wear layer are applied) and the underside of the base or felt web is engaged by the surface of the backing roll 23.

Figures 3, 3A:
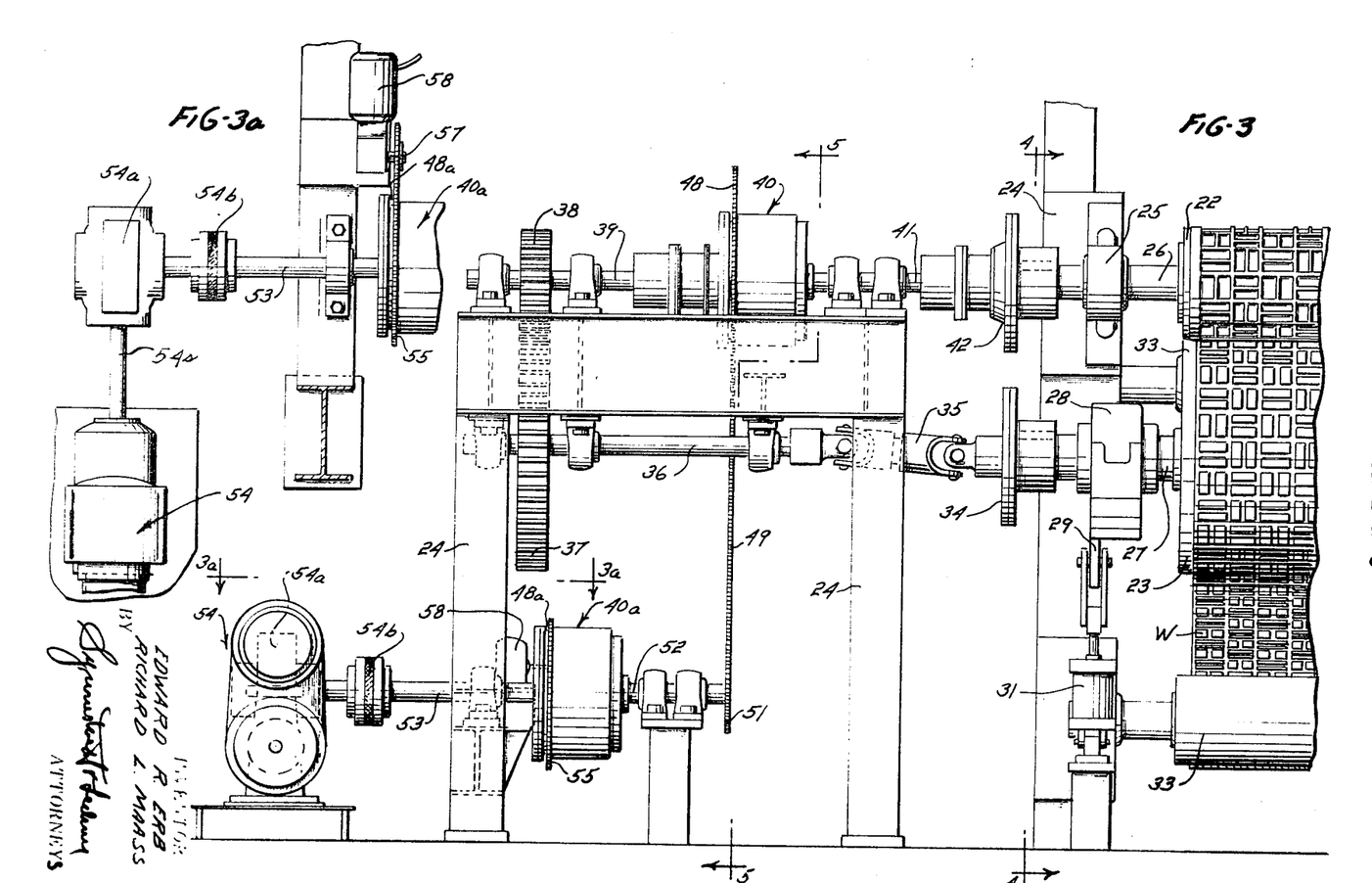
FIG. 3 is a view of portions of embossing and backing rolls employed in the embossing operation diagrammatically illustrated in FIG. 2, together with one example of mechanism for interconnecting the embossing and backing rolls and for regulating the peripheral surface speed of the embossing roll.
FIG. 3a is a fragmentary plan view of certain of the parts shown in FIG. 3, taken as indicated by the section line 3a—3a on FIG. 3.
Figure 4:
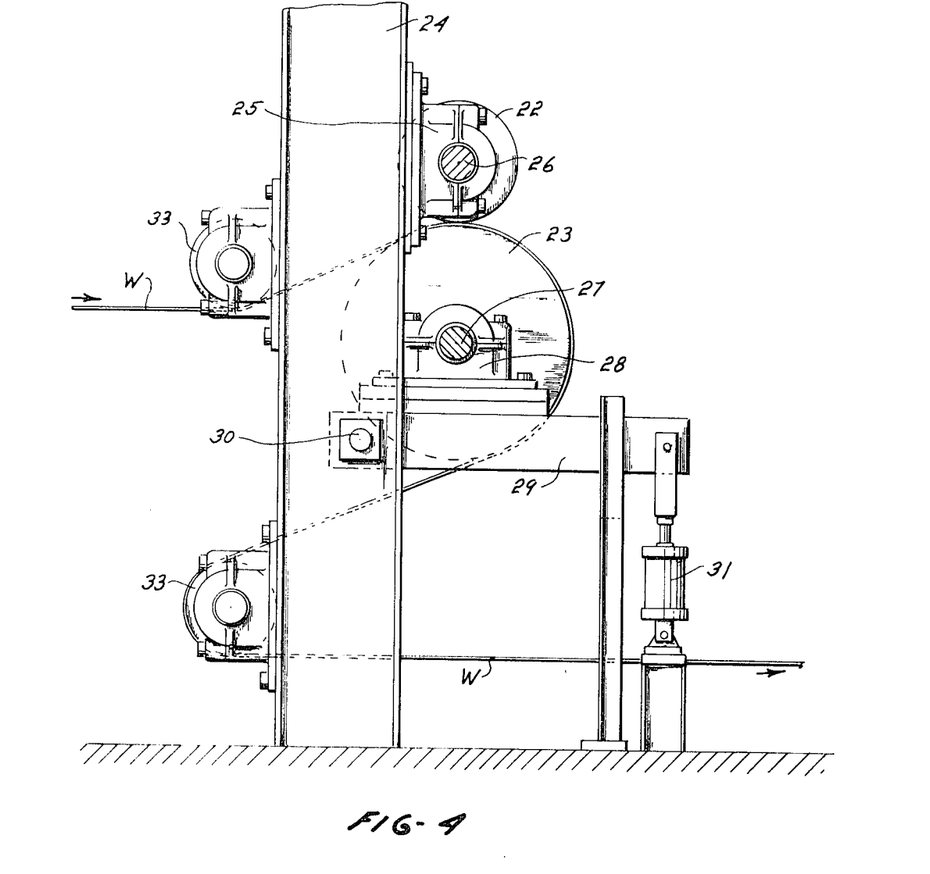
FIG. 4 is a view of various parts taken as indicated by the line 4—4 on FIG. 3.

As best seen in FIGS. 3 and 4, the embossing and backing rolls 22 and 23 are mounted by means of suitable frame or support elements 24. Bearing blocks 25 cooperating with the shaft 26 of the embossing roll rotatively mount the embossing roll in fixed position on the support elements 24. The shaft 27 of the backing roll 23 is mounted by means of bearing blocks 28 carried by a pair of arms 29 which are pivoted at 30 on the supports 24. The position of the free ends of the arms 29 and thus of the backing roll 23 is controlled by a pair of hydraulic piston and cylinder devices such as indicated at 31. These hydraulic devices will serve to control the pressure of engagement of the web in the nip between the embossing and backing rolls.

From FIG. 2 it will be seen that as the web W advances from the oven 18 to the roll embosser, the web passes over and under a pair of guide rolls 32 and, after passing under idler roll 33, over the roll 23 and into the embossing nip. The web is retained in engagement with a large portion of the periphery of the backing roll 23 by means of the second idler roll 33, and after passage over the roll 33 the web is fed to the cooling rolls 20 which, as above noted, serve to draw the web through the embossing nip.

FIG. 2 also diagrammatically illustrates a known form of "dancer" roll assembly 33a which serves to establish or maintain uniformity of tension in the web W as it passes through various parts of the equipment. Because the back surface of the web is maintained in contact with the backing roll 23 through out a substantial portion of the peripheral surface thereof, the backing roll is caused to rotate at a peripheral surface speed substantially identical with the speed of the web surface in contact therewith. In accordance with the preferred practice of the invention, this interengagement of the web and the backing roll constitutes the only driving means for the backing roll. Moreover, as will now be explained, it is further contemplated according to the invention that this driving force which is transferred from the web to the backing roll is the principal source of drive employed to rotate the embossing roll 22.

Figure 5:
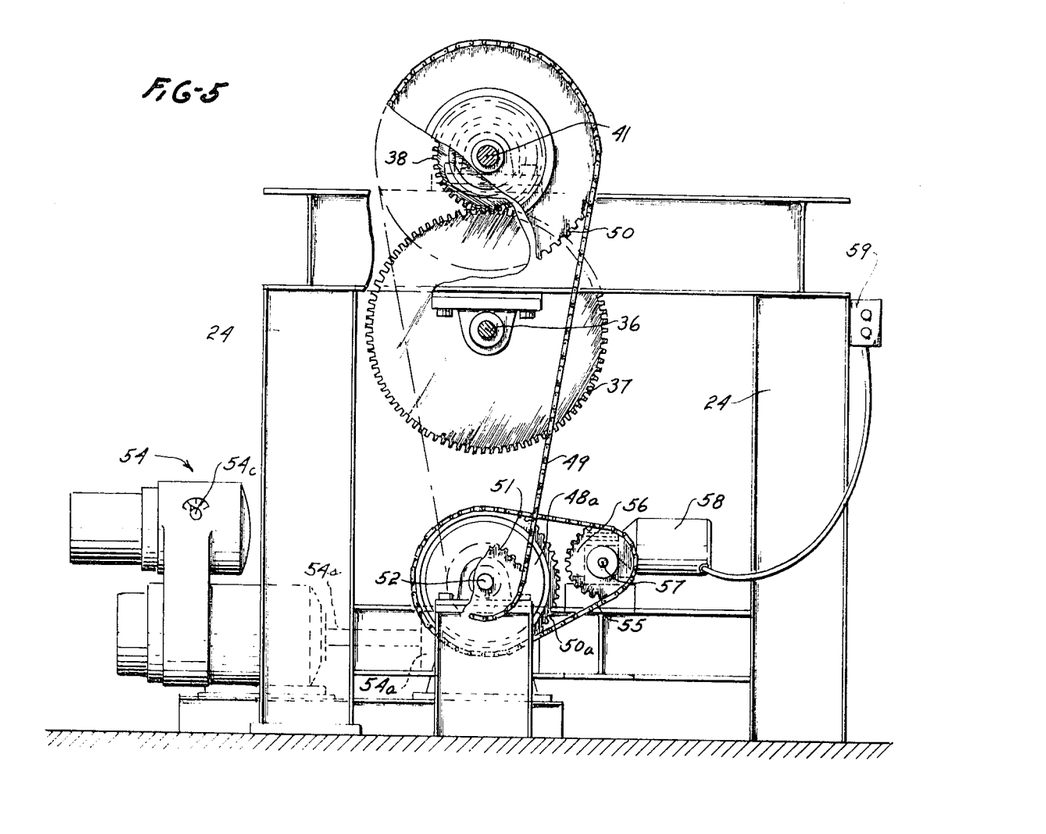
FIG. 5 is a view of various parts taken as indicated by the line 5—5 on FIG. 3.

Power is transmitted from the backing roll 23 to the embossing roll 24 by power transmission mechanism which may take a variety of forms but which preferably incorporates means for varying the peripheral surface speed of the embossing roll with respect to the peripheral surface speed of the backing roll. One form of equipment for accomplishing this purpose is illustrated in FIGS. 3, 5 and 7, as described just below.

The backing roll shaft 27 is connected through a coupling 34 and through a universally jointed shaft section 35 with the shaft 36 journaled on supporting elements 24 in a horizontal position. The universally jointed shaft section 35 accommodates the vertical adjustment movement of the backing roll 23 under the influence of upward and downward swinging of the arms 29 when the hydraulic cylinders 31 are actuated. Shaft 36 carries a spur gear 37 meshing with a spur gear 38 which in turn is mounted on the shaft 39 journaled on supporting framing. Shaft 39 is in turn associated with the planetary gear mechanism generally indicated at 40 with which the shaft 41 is also associated, the latter being connected through coupling device 42 with the shaft 26 of the embossing roll.

Figure 7:
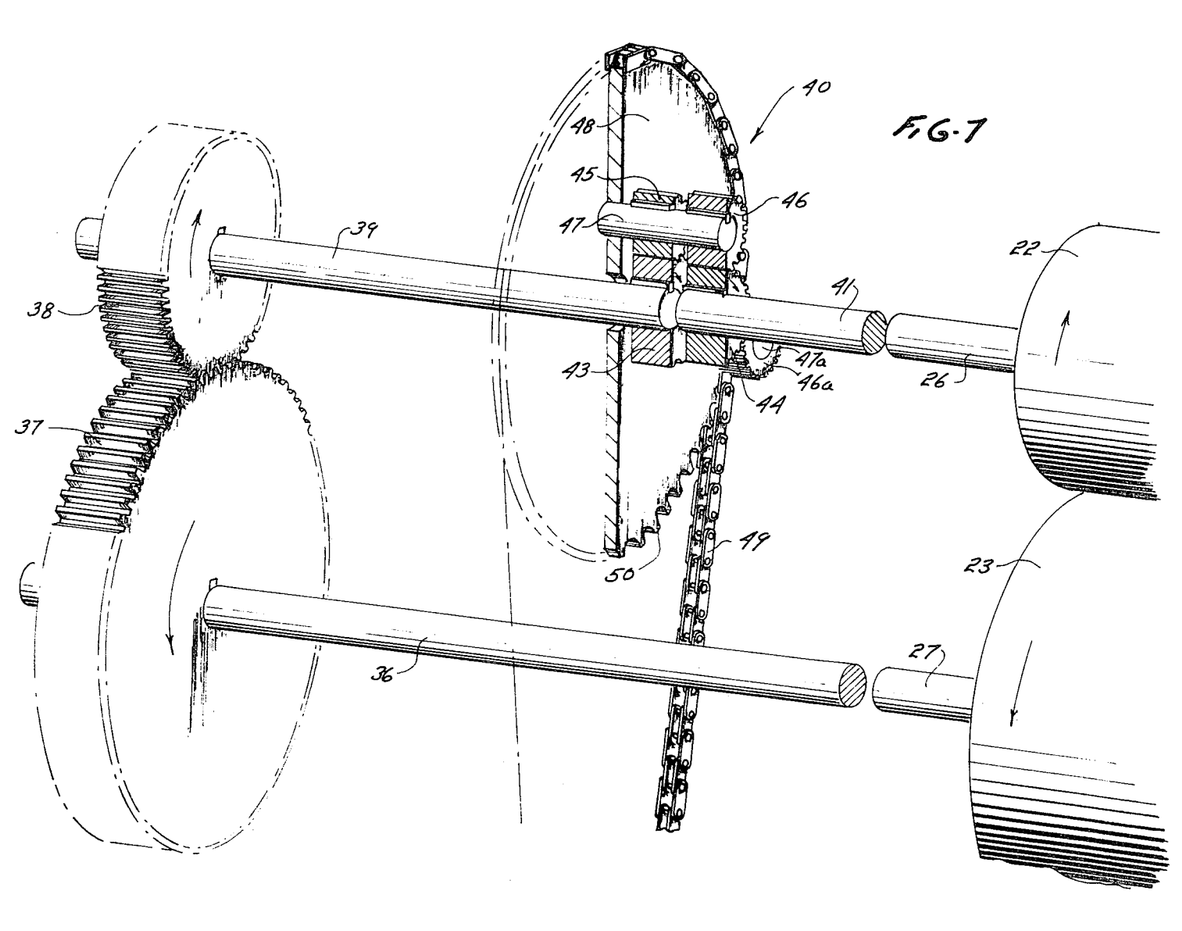
FIG. 7 is a diagrammatic view illustrating certain gearing and drive parts employed in the embodiment of the equipment shown in the other figures.

The essential parts of the planetary gearing unit 40 are illustrated in a diagrammatic manner in FIG. 7. Here it will be seen that the shaft 39 carries a sun gear 43 and that the shaft 41 carries a sun gear 44, the two shafts 39 and 41 not being directly connected within the transmission unit 40 but being connected only through the gearing associated with the sun gears 43 and 44. Gear 43 meshes with gear 45 and gear 44 meshes with gear 46, the gears 45 and 46 both being keyed to shaft 47 which is journaled in the rotative structure illustrated in FIG. 7 as a disc 48. Since the structure 48 is rotative about the common axis of shafts 39 and 41, gears 45 and 46 are planet gears which are orbitally movable about the common axis of the sun gears 43 and 44. Preferably the transmission unit includes several sets of planet gears, three being typical, and it will be noted that toward the right of the disc 48, just below the shaft 41, another planet gear 46a appears, this being mounted upon the shaft 47a. The shaft 47a, like the shaft 47 would also carry a gear meshing with the sun gear 43 and the shaft 47a would be journaled in the rotative structure 48. A third such set of planet gears would be arranged in equispaced relation about the circumference of the sun gears 43 and 44, but these parts are broken out in FIG. 7 for the sake of simplifying and clarifying the illustration of the gearing arrangements.

The rotative structure 48 which carries the planetary gears may be either held stationary or may be turned in one direction or the other by means of the chain 49 cooperating with the sprocket teeth 50 formed at the periphery of the structure 48.

As will clearly be seen from inspection of FIG. 7, rotation of the backing roll 23 under the influence of motion of the web, as above described, will cause rotation of shaft 36 and gear 37 and this in turn will rotate gear 38 and shaft 39. If the rotative structure 48 is held stationary, the shafts 47 of the pairs of planet gears will not revolve around the common axis of the shafts 39 and 41, but the sun and planet gears 43, 45, 46 and 44 will transmit driving force from the shaft 39 to the shaft 41 which, in turn, will rotate shaft 26 and thus the embossing roll 22. Thus, if the rotative structure is held stationary, the relation of the peripheral surface speed of the embossing roll to the peripheral surface speed of the backing roll will depend upon the relative sizes of the gears 37 and 38 and also upon the relative sizes of the sun and planet gears of the transmission unit 40.

It is contemplated according to the present invention that the rotative structure 48 of the transmission unit 40 be controlled by some adjustable power means, and the equipment herein described and illustrated for this purpose includes another planetary gearing unit indicated generally in FIGS. 3 and 3a at 40a, this unit being of essentially the same basic construction as the unit 40, incorporating sun and planet gears such as those described above with reference to FIG. 7 and including also a mounting structure 48a for the planet gears. Since the unit 40a is essentially the same as unit 40, the description thereof will not be duplicated. However, the connection of this unit in the system is described, as follows.

Chain 49 which regulates the motion of the mounting structure 48 for the planet gears of the unit 40 is controlled by a sprocket 51 mounted on shaft 52 which is one of the shafts provided with a sun gear in the transmission unit 40a. Shaft 53 is arranged coaxially of the shaft 52 and carries the other sun gear of the transmission unit 40a. As seen in FIGS. 3, 3a and 5, shaft 53 is adapted to be driven through a variable speed power drive mechanism indicated generally at 54 and including a speed reducing unit 54a, driven by shaft 54s, the connection between the speed reducing unit and the shaft 53 including the coupling 54b. Unit 54 is desirably provided with a speed control 54c adjustable to approximate the correction desired in the drive of the embossing roll 22 from the backing roll 23, as is explained more fully hereinafter.

The rotative planet gear mounting structure 48a of the unit 40a has sprocket teeth 50a with which the chain 55 cooperates, the chain 55 also meshing with sprocket 56 mounted on the shaft 57 which is driven by the fixed speed geared driving motor 58. The motor 58 is preferably a reversible power unit controlled, for example, by the push buttons of the manual control 59, so that the direction of rotation of the mounting structure 48a for the planet gears of the transmission unit 40a may be intermittently operated in either direction of rotation.

It should be understood that various drive and transmission units may be employed for the purposes of the present invention, the mechanism herein illustrated representing one preferred embodiment. The essential purposes and operational characteristics contemplated by the invention are described herebelow and may be achieved by the mechanism described and illustrated and also by other mechanisms or arrangements capable of achieving the same operational characteristics as described.

In connection with the production of decorative surface covering material in accordance with the present invention, it is here pointed out that a printed pattern applied by the printing stages 12–15 inclusive as illustrated in FIG. 1 provides for the repetition of the printed pattern at predetermined intervals along the length of the web. It is further contemplated that the embossing roll 22 be provided with lands and valleys conforming with at least some portions of the printed pattern, and in a typical embodiment of the equipment, the embossing roll 22 has a circumference which is evenly divisible by the length of the predetermined printed pattern which is repeated at intervals along the web. In the preferred embodiment, the circumference of the embossing roll is equal to the distance between adjacent points of repetition of the printed pattern. This is preferably accomplished by use of an embossing roll 18 inches in circumference, which is representative of a commonly employed pattern repeat. Printing rolls used with such 18 inch pattern repeat are preferably 36 inches in circumference.

In a typical operation with printing and embossing rolls of 36 and 18 inch circumference respectively, and with the embossing roll rotated merely by virtue of engagement with the web, it is found that if the embossing roll is in registration with the printed pattern at a starting point, upon advancement of the web by 18 inches, the next starting point of the pattern on the embossing roll will not return to engagement with the web until about ⅛ inch beyond the point where the printed pattern commenced its repetition. Because of this, in such a typical operation, in order to maintain registration of the embossing roll with the printed pattern, it is necessary to provide for rotation of the embossing roll at a peripheral surface speed higher than that of the backing roll, notwithstanding the fact that the pattern repeat on the printing and embossing rolls are both of equal dimension circumferentially of the printing and embossing rolls.

In this typical operation here under consideration it will therefore be seen that it is necessary, in order to maintain registration of the embossing roll with the printed pattern, to increase the speed of rotation of the embossing roll above that which would be established as a result of rotation of the embossing roll merely by virtue of engagement with the web as the web passes through the embossing nip.

It is contemplated according to the present invention that the correction required by way of increase in speed of the embossing roll be effected by the drive unit 54 for rotating the input shaft 53 of the transmission unit 40a, thereby providing for a continuous approximate corrected speed of rotation of the support 48 (through connecting parts 52, 51 and 49) for the planet gears 45 and 46 of the transmission unit 40 which of course will also result in correction of the speed of the embossing roll 22.

The speed of rotation of the output shaft 52 of the unit 40a is also controllable under the influence of the intermittent operation of the reversible drive unit 58 by actuation of manual control 59. Thus, shaft 57 of this drive unit carries sprocket 56, and chain 55 is connected with sprocket 50a rotating with support 48a for the planet gears of the unit 40a. It is contemplated according to the invention that this intermittent control 59 be employed as an adjustment means by which the operator may compensate for minor deviations from registration, which would otherwise become cumulative. Control 59 can also be used to correct irregularities, for example, as a result of a splice in the web. Although this monitoring or intermittent adjustment can be effected under the control of electro-optical means observing or sensing the printed pattern as it passes a given point, it can also be controlled merely by an operator adjusting the control 59 in accordance with his visual observation of the registration as the web leaves the embossing rolls.

Various factors may influence the registration problem, including creepage of the web, shrinkage or stretching of the product being made, the thickness and density of the foam being embossed, the overall thickness of the product and probably a number of other factors. Some of these factors may require increase in speed of the embossing roll in order to maintain registration, and other factors may work in the opposite sense. However, it is believed that ordinarily the controlling factors are such as to require increase in the peripheral surface speed of the embossing roll, but is is possible that under some circumstances a reduction in peripheral surface speed might be needed. The increase or decrease in peripheral surface speed here mentioned represent increase or decrease in relation to the peripheral surface speed of the backing roll.

In considering another aspect of the equipment provided in accordance with the present invention, it is again pointed out that in certain prior attempts to utilize embossing rolls for embossing a resinous foam, difficulty has been encountered because of tendency to produce wrinkles or blisters in the material being embossed. This has been especially true in attempts to utilize embossing rolls upon a resinous foam surface covering material having a substantially impervious, usually transparent, resin wear layer overlying the foam. The origin of this problem apparently lies in the fact that the embossing action results in collapse of foam cells in the areas underlying the lands of the embossing roll. The gas or air from these collapsed cells is forced or driven laterally under the surface layer of the product into areas in registry with the valleys of the embossing roll. This action has created problems with wrinkling and blistering, thereby damaging the decorative effects sought to be secured.

Figure 6:
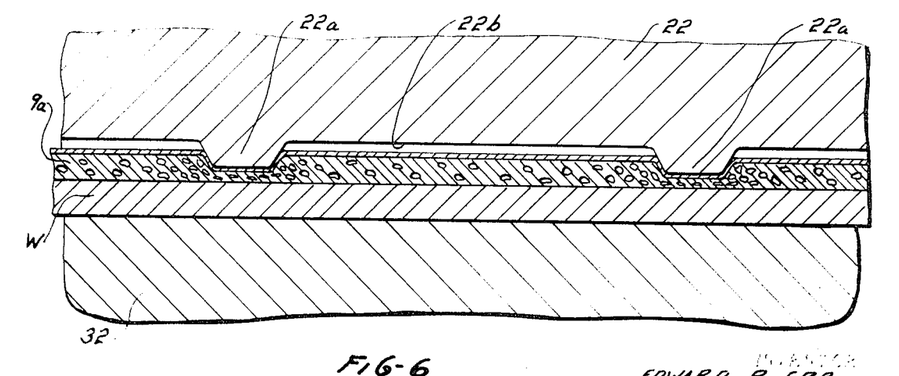
FIG. 6 is a greatly enlarged longitudinal sectional view through portions of the embossing and backing rolls forming the embossing nip and illustrating the embossing action upon the product being passed through the nip.

According to the present invention the foregoing difficulty has been overcome by employment of an embossing roll of the type somewhat diagrammatically illustrated on an enlarged scale in FIG. 6. Here the backing roll is indicated at 23 and the embossing roll at 22. The product being embossed is here shown as including a felt web W on which a foamed resin layer 9a covers or is laminated to the web and having a printed decoration (not shown) and also an overlying transparent resin wear layer 17a.

The lands of the embossing roll such as indicated at 22a in FIG. 6 serve to provide the valleys in the embossed pattern being imparted to the product and in doing so these lands collapse the underlying foam cells, as is indicated more or less diagrammatically in FIG. 6, resulting in lateral dissipation of the gas from the collapsed cells into the areas underlying the valleys 22b of the embossing roll.

Examination of FIG. 6 will show that these valleys 22b of the embossing roll are not in contact with the surface of the product being embossed and it is contemplated according to the present invention that valleys be provided in the embossing roll adjacent to the lands thereof, which valleys are of sufficient depth to avoid contact with the product. In considering the importance of this it is to be noted that if the valleys of the embossing roll snuggly engaged the product or exerted some pressure upon the product, this would restrict the lateral dissipation of the gases from the collapsed foam cells underlying the lands of the embossing roll and in consequence it has been found that blisters or wrinkles tend to be produced. According to the present invention it has further been found that this tendency toward blistering or wrinkling can be overcome by providing valleys in the embossing roll of depth sufficient to avoid restriction of the lateral dissipation of the gases in the foam layer lying beneath the impervious top wear layer of the product.

The technique of the invention may be used to produce products of a wide variety of designs having the embossed or relief effect in registration with the printed pattern and is capable of producing very pronounced or deeply embossed effects in some or all of the valley areas of the relief effect, as desired.

TYPICAL OPERATION INCLUDING FORMULATIONS

Quantities of materials and formulations referred to below are given in parts by weight.

In a typical operation according to the present invention, the foamable composition applied to the web, for instance by the reverse roll coater indicated at 9 in FIG. 1, may be formulated as follows:

For each 100 parts of resin (homopolymer dispersion PVC resin of 2.05 relative viscosity):

| | |
|---|---|
| Butylbenzyl phthalate (plasticizer) | 56.00 |
| Mineral spirits | 4.25 |
| Epoxidized soya oil | 6.4 |
| Titanium dioxide | 7.4 |
| Azodicarbonamide | 2.5 |
| Zinc Octoate (8% zinc) | 2.225 |

This foamable coating is then gelled, but without decomposing the foaming agent, by passage through the oven 10 shown in FIG. 1, and after cooling of the web the printed pattern is applied as indicated at 12, 13, 14 and 15.

The clear top coating applied by the reverse roll coater 17 in FIG. 2 may be formulated as follows:

For each 100 parts of a high molecular weight homopolymer dispersion PVC resin of 2.65 relative viscosity:

| | |
|---|---|
| Dioctyl phthalate | 35.0 |
| Epoxidized soya oil | 7.0 |
| Polyethylene glycol monolaurate | 0.8 |
| Light stabilizer | 5.0 |
| High boiling mineral spirits | 18.0 |

The oven 18 shown in FIG. 2 then serves to fuse the resin materials and decompose the blowing agent uniformly throughout the area of the product. Thereafter the web is passed while still hot, for instance while at a temperature of from about 225° F. to about 325° F. through the embossing nip as fully described above.

Backing roll 23 is preferably cooled by water circulation to a temperature below about 200° F., and the embossing roll 22 may also be cooled. Cooling of the backing roll will assist in "freezing" the embossed design.

We claim:

1. Equipment for embossing a web of a surface covering material having a base with a foamed resin layer carrying a printed color pattern repeated at predetermined intervals of length along the web, the equipment comprising an embossing roll having lands and valleys in a pattern conforming with the printed pattern and having a circumferential dimension evenly divisible by the length of said predetermined intervals, a backing roll cooperating with the embossing roll to provide to provide a nip to receive the web with the base adjacent the backing roll, web driving means engaging the web beyond said nip and serving to draw the web through the nip, guide means providing for engagement of the web with the backing roll through a substantial portion of the circumference of the backing roll and thereby provide for rotation of the backing roll under the influence of its engagement with the web, and mechanism for rotating the embossing roll including a drive transmission connecting the embossing roll with the backing roll and including adjustable means for rotating the embossing roll at a peripheral surface speed higher than the peripheral surface speed of the backing roll including orbital planet gears, and a variable speed motor for controlling the orbital motion of the planet gears.

2. Equipment for embossing a web of a surface covering material having a base with a foamed resin layer carrying a printed color pattern, the equipment comprising an embossing roll having lands and valleys in a pattern conforming with the printed pattern, a backing roll cooperating with the embossing roll to provide a nip to receive the web with the base adjacent the backing roll, web driving means engaging the web beyond said nip and serving to draw the web through the nip, guide means providing for engagement of the web with the backing roll through a substantial portion of the circumference of the backing roll and thereby provide for rotation of the backing roll under the influence of its engagement with the web, and mechanism for rotating the embossing roll including a driving transmission connecting the embossing roll with the backing roll and including adjustable means for varying the speed of the embossing roll in relation to the backing roll including two coaxial shafts one connected with the embossing roll and one connected with the backing roll, sun gears fixed to said shafts, planet gears respectively meshing with the sun gears, the planet gears being interconnected to rotate together, means mounting the planet gears for orbital motion about the common axis of the sun gears, and controllable means whereby an electrically reversible or variable power means is adapted to rotate the planet gear mounting means to enable orbiting of the planet gears.

3. In an improved apparatus for making a surface covering of the type including a base material preferably in the form of a web having top and bottom surfaces, said top surface adapted to carry a foamed resin layer having printed and embossing pattern effects in registration with each other, means for applying a thermally foamable resin layer to the top surface of the base web and for applying a printed decoration to the foamable layer, web feeding means located downstream of an oven which means being adapted to engage the web and draw said web through said oven to effect heating of said foamable layer and thus develop said foam, an embossing roll, transmission means for driving said embossing roll interconnecting a backing roll and said embossing roll, the improvement comprising disposing said embossing roll downstream of said oven in combination with said backing roll to provide an embossing nip therebetween, said embossing roll and said backing roll being respectively positioned to engage said foamed layer at a point between said oven and a cooled web feeding roll before extensive drop in temperature after leaving said oven, the bottom surface of said foamed material engaging a portion of the circumference of said backing roll to provide for rotation of said backing roll through the influence of its engagement with said foamed material and an adjustable means for varying the peripheral surface speed of said embossing roll in relation to said backing roll and thereby provide for maintenance of the registration of said embossing roll with said printed pattern.

4. In an improved apparatus as claimed in claim 3, including an embossing roll having lands and valleys in a pattern conforming with a printed pattern, the improvement comprising providing said embossing roll with valleys of a depth sufficient to provide the desired depth of embossing by the lands of said roll without bringing the valleys of said roll into contact with the lands of the pattern being produced on the product.

5. In an improved apparatus as claimed in claim 3 wherein said backing roll rotates at a peripheral surface speed substantially identical with the speed of said web.

6. In an improved apparatus as claimed in claim 4 wherein clearance is provided in the valleys of said embossing roll in a manner to avoid contact between the surface of said product and said valleys of embossing roll resulting in a product with non-uniform cross-sectional thickness.

7. Equipment for embossing a web surface covering material having a foamed resin layer with an overlying top layer of substantial impervious resin material, the equipment comprising a pair of rollers cooperating to provide an embossing nip, at least one of the rollers having embossing lands projecting at the peripheral of the roll to compress the foamed resin only in the areas to be formed as valleys in said foamed resin, the recessed areas in said embossing roller between lands being of sufficient depth to provide for said compression of the foamed resin without contacting the remaining area of the pattern being produced on the product.

8. Equipment according to claim 7 including means for controlling the pressure of engagement of the web in the nip between said rollers.

* * * * *